United States Patent
Møller

(10) Patent No.: US 10,619,624 B2
(45) Date of Patent: Apr. 14, 2020

(54) CURTAILED OPERATION OF A WIND POWER PLANT BY DEACTIVATION OF WIND TURBINES

(71) Applicant: VESTAS WIND SYSTEMS A/S, Aarhus N (DK)

(72) Inventor: Henrik Møller, Egå (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 15/528,421

(22) PCT Filed: Nov. 11, 2015

(86) PCT No.: PCT/DK2015/050342
§ 371 (c)(1),
(2) Date: May 19, 2017

(87) PCT Pub. No.: WO2016/078663
PCT Pub. Date: May 26, 2016

(65) Prior Publication Data
US 2017/0321655 A1    Nov. 9, 2017

(30) Foreign Application Priority Data
Nov. 20, 2014 (DK) .................................. 2014 70720

(51) Int. Cl.
*F03D 7/04* (2006.01)
*F03D 9/25* (2016.01)
(Continued)

(52) U.S. Cl.
CPC .......... *F03D 7/048* (2013.01); *F03D 7/0264* (2013.01); *F03D 9/257* (2017.02); *G05B 19/042* (2013.01);
(Continued)

(58) Field of Classification Search
CPC ......... G05B 2219/2619; F05B 2240/96; F05B 2270/1033
See application file for complete search history.

(56) References Cited

U.S. PATENT DOCUMENTS

| 9,395,707 B2 * | 7/2016 | Anderson .......... G05B 13/0265 |
| 2002/0029097 A1 * | 3/2002 | Pionzio, Jr. ............. F03D 7/047 700/286 |

(Continued)

FOREIGN PATENT DOCUMENTS

| CN | 103717887 A | 4/2014 |
| EP | 1571746 A1 | 9/2005 |
| WO | 2013/000473 A1 | 1/2013 |

OTHER PUBLICATIONS

Danish Search Report for PA 2014 70720, dated Jun. 17, 2015.
International Search Report for PCT/DK2015/050342, dated Jan. 18, 2016.

*Primary Examiner* — Robert E Fennema
*Assistant Examiner* — Jonathan Michael Skrzycki
(74) *Attorney, Agent, or Firm* — Patterson + Sheridan, LLP

(57) ABSTRACT

The invention relates to a method for operating a group of wind turbines in a wind power plant coupled to a utility grid, comprising the steps of determining that a wind turbine should be deactivated in response to receiving a power curtailment command from the grid, and retrieving data from each wind turbine in the group of wind turbines. Further, the method comprises ranking all the wind turbines according to a set of ranking criteria and based on the retrieved data, and selecting a wind turbine to be deactivated based on the ranking. Further, the steps of data retrieval and ranking of all the wind turbines including any deactivated wind turbines in the group are repeated at time intervals, and the wind turbine to be deactivated is re-selected based on
(Continued)

this updated ranking. The data may include a down time for any presently deactivated wind turbine in the group of wind turbines, reflecting for how long time the wind turbine has been presently deactivated, and the set of ranking criteria may then comprise a pause criterion taking into account the down time.

20 Claims, 2 Drawing Sheets

(51) Int. Cl.
 *F03D 7/02* (2006.01)
 *G05B 19/042* (2006.01)

(52) U.S. Cl.
 CPC ..... *G05B 2219/2619* (2013.01); *Y02E 10/723* (2013.01); *Y02E 10/725* (2013.01)

(56) References Cited

U.S. PATENT DOCUMENTS

| | | |
|---|---|---|
| 2008/0048501 A1 | 2/2008 | Jurkat et al. |
| 2010/0032957 A1 | 2/2010 | Stephany |
| 2010/0308585 A1 | 12/2010 | Jorgensen et al. |
| 2012/0072039 A1 | 3/2012 | Anderson et al. |
| 2014/0103652 A1* | 4/2014 | Ubben .................. F03D 7/028 290/44 |
| 2014/0207296 A1 | 7/2014 | Kjaer et al. |
| 2016/0061189 A1* | 3/2016 | Chen .................. F03D 7/0284 290/44 |
| 2016/0099567 A1* | 4/2016 | Sun .................. H02J 3/14 700/296 |

* cited by examiner

CURTAILED OPERATION OF A WIND POWER PLANT BY DEACTIVATION OF WIND TURBINES

FIELD OF THE INVENTION

The present invention relates to a method for operating a group of wind turbines in a wind power plant coupled to a utility grid, wherein one or more of the wind turbines are deactivated in response to a power curtailment command from the grid.

BACKGROUND

Often multiple wind turbines (WT) are arranged together and connected in wind power plants (WPP) with a common power plant controller (PPC) for monitoring and controlling the operation of each or at least a number of the wind turbines. In general when operating a wind turbine or a wind power plant it is aimed to obtain maximum yield of the capital invested in it. In order to comply with this, wind turbine control systems are configured to maximise the power output. However, the wind power plant further needs to meet the power production demand and requirement from the utility grid.

A wind power plant may receive a power curtailment command from the grid requiring the power output from the wind power plant to be reduced. The power plant may need to be curtailed due to for example faults on transmission lines, transformer faults, lack of transmission lines capacity, frequency control, power trading, etc. Within certain limits a power curtailment demand from the grid can be handled by power derating one or more of the wind turbines, i.e. reducing the power output of one or more of the wind turbines. However, many wind turbines (especially pitched turbines) cannot be controlled in the whole range of the turbine rated power between zero power to nominal power, but can only be controlled between a technical minimum set point and up to nominal power. Therefore, a curtailment command from the grid may require one or more turbines to be stopped and deactivated to achieve a power output level corresponding to the grid demand.

WO 2013/000473 discloses the controlling of the wind turbines in a wind power plant during curtailment and how to decide which wind turbine is to be deactivated based on different criteria such as for example fatigue data, earlier production compared to potential power production, and other performance criteria.

In general, however, it is not desirable to have a turbine stopped for a very long period without moving or producing power among other reasons because of the need to maintain a minimal lubrication between the machine parts. Traditionally, all stopped or deactivated wind turbines in a power plant are therefore turned on manually from time to time and allowed to produce a limited amount of power irrespective of any curtailment commands from the grid.

DESCRIPTION OF THE INVENTION

It is therefore an object of embodiments of the present invention to provide an improved wind power plant control wherein the most favourable wind turbines are operated to produce power in accordance with the power requirement from the grid.

A further object of embodiments of the invention is to overcome or at least reduce some or all of the above described disadvantages of the known methods of wind power plant control by providing a control method minimizing the risk of insufficient lubrication and wear due to deactivation.

In accordance with the invention this is obtained by a method for operating a group of wind turbines in a wind power plant coupled to a utility grid, where the method comprises the steps of determining in response to receiving a power curtailment command from the grid that one or more wind turbines in the group of wind turbines should be deactivated, and retrieving data from each wind turbine in the group of wind turbines. Further, the method comprises ranking all the wind turbines in the group of wind turbines according to a set of ranking criteria and based on the retrieved data, and selecting one or more wind turbines in the group of wind turbines to be deactivated based on the ranking. Further, the steps of data retrieval and ranking of all the wind turbines in the group of wind turbines including any deactivated wind turbines in the group are repeated at time intervals, and the one or more wind turbines in the group of wind turbines to be deactivated are re-selected based on the updated ranking.

The group of wind turbines may comprise all or any subset of the wind turbines in the wind power plant, and the wind power plant may be placed at the same geographical location or may be combined from more geographically separated wind power plants.

A power curtailment command from the grid can result from a number of reasons such as for example faults on transmission lines, transformer faults, lack of transmission lines capacity, frequency control, power trading, etc. Also, as the available wind resources and the requirements of the grid may vary over time, it is possible that the capability of the wind turbines in wind power plant simply exceed the power required by the grid. In such situations, one or more wind turbines may be deactivated to reduce the amount of power produced.

In traditional wind power plants, the particular wind turbines are selected for deactivation on a random basis, on the basis of a fixed priority scheme, or the like. The selected wind turbines then remain stopped for a predetermined time period or until another curtailment command is received. However, different turbines of a wind power plant may face very different operating environments which may change over time. As a result different turbines may experience different amount of wear and tear, or fatigue. Similarly, other factors may influence the wind turbines differently over time, or may have a more or less sudden impact on some of the turbines, influencing how the wind turbines should most favourably be operated both in a short time frame (such as e.g. an alarm signal requiring some sort of action to be taken immediately or within some relatively short time frame) or in a longer time horizon (such as e.g. some economical goal to be met or the wearing of some component).

The invention advantageously provides a method for selectively choosing which turbine or turbines in a wind power plant to deactivate such that less favourable wind turbine(s) are deactivated and the more favourable turbines are producing power not only when the power curtailment command is first received but at all times. This is obtained according to the invention by continuously and repeatedly retrieving data and ranking all the wind turbines in the group of wind turbines, regardless if the curtailment command has changed and for all the wind turbines including any deactivated wind turbines in the group.

In this way the operating method continuously or repeatedly re-evaluates and re-selects the one or more wind turbines to be deactivated at time intervals based on the chosen set of ranking criteria. Hereby the method of operation catches or intercepts any data which may have changed since the last selection and caused the ranking position of any of the wind turbines in the group of wind turbines to change. In other words, the continuous re-evaluation of the different ranking criteria determines and updates the ranking and the priority of the wind turbines in the wind power plant and thereby qualifies a stopping or a swapping of the actively producing turbines. This requires that the ranking criteria are re-evaluated and data retrieved from both deactivated and active wind turbines.

In an embodiment of the invention the re-selecting of one or more wind turbines in the group of wind turbines to be deactivated comprises reactivating one or more other wind turbines in the group of wind turbines. The operation method may lead to a swapping of the actively producing turbines meaning that one or more turbines may be deactivated and one or more wind turbines reactivated instead. The swapping may lead to more wind turbines being deactivated than reactivated, or reversely, depending on the power curtailment command from the grid and on the potential power production of each wind turbine.

The invention according to the above is advantageous in a stable situation where one or more wind turbines have already been stopped and deactivated according to the ranking at the time due to a curtailment command and where the ranking changes afterwards (for example due to changes in the retrieved data or perhaps a change in the ranking criteria) which qualifies other wind turbines to be stopped instead.

As mentioned above, the operation method may involve swapping of the actively producing turbines meaning that one or more turbines are selected to be deactivated and one or more wind turbines are selected to be reactivated instead. The deactivation and reactivation may be initiated at the same time, successively, or with a certain delay. For example, a reactivation of wind turbines may be initiated first and the deactivation with a certain time delay. This is advantageous as the deactivation or stopping of a wind turbine normally takes shorter time than an upstart of a wind turbine. In this way a potential temporary drop in output due to a swapping of active turbines is avoided. The command for deactivation may be delayed for a time period of 1-10 minutes or around 1-2 minutes.

In one embodiment the retrieved data includes a down time for any presently deactivated wind turbine in the group of wind turbines, reflecting for how long the wind turbine has been presently deactivated and wherein the set of ranking criteria comprises a pause criterion taking into account the down time.

Hereby is obtained that the down time of each wind turbine is taken into account when selecting and reselecting which wind turbine to potentially deactivate. Hereby is avoided that any turbine is stopped or deactivated for a longer period, and thereby ensuring that all turbines in the Wind Power Plant will be running and producing power regularly, while still being able to maintain the required curtailed output level of the WPP. This is important in order to avoid any kind of damage or aging of the wind turbines due to long periods of inactivity. For example regular activity of the turbine can be required to uphold a sufficient lubrication of gears, shafts etc.

By the embodiment according to the invention, any turbine(s) that has been stopped for a longer period (configurable) will automatically be swapped with other turbines that are currently running and producing power. Hereby any additional monitoring and manual overruling of a deactivation of a wind turbine is no longer needed.

The reactivation or swapping could hereby be initiated by expiry of a predefined maximum down time, or due to other priority changes among the turbines, or a combination of these two.

The data retrieval and ranking of all the wind turbines in the group of wind turbines may be repeated at time intervals of fixed length or at varying length and/or the re-selecting may be performed at regular prescribed time intervals. The length of the time intervals may be pre-determined or may vary for example as a function of the commands from the grid, of some of the retrieved data, the wind, or as a function of the ranking. The ranking and reselection can for example be performed more often if the wind direction changes or be performed at longer time intervals in order to avoid continuous swapping of two turbines in case the ranking has been observed to change back and forth.

The time intervals may be of the length of seconds, minutes, hours, or days. In one embodiment the reselection is performed every second, or a number of times every minute, or at least a number of times every hour, such as at time intervals of 0.5 seconds-1 minute and/or at time intervals of 1 second-1 day. The reselection may be performed in addition to or regardless of any change in the power curtailment command from the grid.

The data retrieved from the wind turbines in the wind power plant may include data such as data from sensors (e.g., blade load sensors, tower load sensors), environmental conditions (e.g., wind speed and direction, turbulence, temperature, humidity), accumulated power production, running hours, fatigue data, data regarding failures or alarms (such as temperatures of e.g. lubrication oil exceeding certain limits), relative position of the turbines in relation to one or more other turbines given the wind direction, and the like. The data may include lifetime data and/or current or recently experienced data.

The data may be collected by one or more power plant controllers and may be stored locally or centrally in a memory or a mass storage. Additionally or alternatively, the data may be collected by a SCADA system coupled to the wind power plant in which case a power plant controller may be configured to retrieve the data from the SCADA system, when desired.

A set of ranking criteria are then evaluated in which at least some of the retrieved data is used, and which are used to rank or prioritize all the wind turbines in the group. This ranking, contrary to traditional curtailment methods, also includes any deactivated and non-producing wind turbines.

In an embodiment the set of ranking criteria comprises criteria based on data including one or more of loads, running hours, alarms, fatigue data, user priorities, and power production. The ranking criteria could for example include the productivity of each wind turbine (e.g. accumulated for its entire lifetime, or for a certain period of time such as the last financial year etc.), the wear and/or accumulated fatigue, the running hours, a load index, or user or owner set priorities (for example expressing a desired income distribution). The ranking criteria may be pre-determined or may be adapted or changed dynamically. Hereby the ranking criteria can be adapted to take into account new types of data or combinations of data, or changed to fine tune the ranking e.g. based on experience or experiments.

The invention applies to any situation where one or more wind turbines in the wind power plant needs to be deactivated to achieve the required power plant output, no matter what control strategy, set point calculation strategy and dispatching strategy is used in a specific case. It is the situation or the fact that the power plant controller needs to deactivate wind turbines to achieve an output level and meet a curtailment command that is relevant.

According to another embodiment of the invention, the data includes the time of power production for each of the wind turbines in the group of wind turbines over a time period. The time period may be the life time of the wind turbine or a shorter time period such as the last year, the financial year, or another predetermined relevant time period. In this way the wind power plant operation takes into account how active in time each wind turbine has been during a time period and takes into account the historical data of the wind turbines in the power plant and not only the present or recent data. In this way any swapping back and forth (or alternatingly starting and stopping) of any of the wind turbines may be avoided.

In a further embodiment of the invention, the data includes the power produced by each of the wind turbines in the group of wind turbines over a time period. The time period may be the life time of the wind turbine or a shorter time period such as the last year, the financial year, or another predetermined relevant time period. Hereby the wind power plant may for example be operated such that all wind turbines in the group produce according to some desired distribution such as approximately all the same. Hereby may also be avoided that some of the turbines are producing significantly more power than others and thereby potentially experience a higher fatigue and wear.

In another embodiment the data includes information of the ownership of each wind turbine in the group of wind turbines, and the set of ranking criteria comprises an production criterion taking into account the power produced to the grid by each owner over a prescribed period of time. Hereby the operation method can take into account the ownership of the wind power plant and operate it such that a certain predetermined revenue allocation between the owners can be met.

The operating method according to embodiments of the invention may involve selecting not only a single but at times a plurality of wind turbines to be deactivated in response to the power curtailment command. Hereby the number of wind turbines to be deactivated can at any time be such that the power curtailment command from the grid is met. The number of turbines to be deactivated may depend on the power curtailment command and the power production level of each of the active wind turbines in the group. An embodiment of the invention therefore comprises comparing a power command from the grid to the present power capacity from the group of wind turbines and determining the number of turbines to be de-activated based on the comparison.

The available power capacity is determined under given current operation conditions and may be determined in various ways. One way of determining the available power capacity is based on a measurement of the actual wind speed.

In an embodiment of the invention, the re-selection of a wind turbine to be deactivated is further based on earlier rankings of the wind turbines in the group of wind turbines. Hereby a certain time based hysteresis can be built into the operation method such that any continuous swapping can be avoided in case the ranking changes constantly.

As also mentioned previously, the ranking criteria can be pre-determined and/or the ranking criteria can be changed dynamically.

The invention according to another aspect relates to a wind power plant comprising a group of wind turbines coupled to a utility grid and comprising a power plant controller configured to perform the method of operation according to any of the above described operation method. The advantages hereof are as described in relation to the method of operation.

BRIEF DESCRIPTION OF THE DRAWINGS

In the following different embodiments of the invention will be described with reference to the drawings, wherein.

DETAILED DESCRIPTION OF THE DRAWINGS

Figure 1:
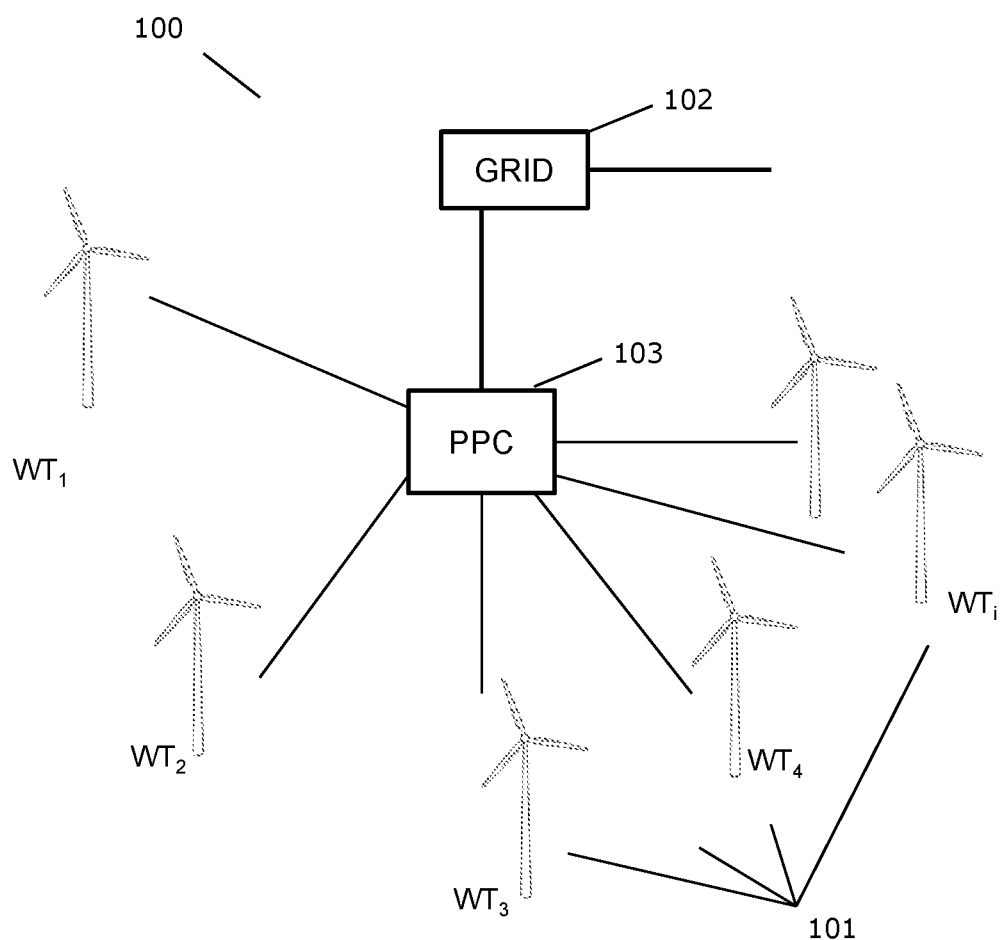
FIG. 1 illustrates an exemplary wind power plant coupled to a utility grid and according to an embodiment of the invention.

FIG. 1 illustrates an exemplary wind power plant 100 according to an embodiment of the invention. As illustrated, the wind power plant 100 includes a group of wind turbines (WT) 101 which is coupled to a utility grid 102. The wind turbines 101 are coupled to a power plant controller 103 which controls the operation of the wind power plant 100. The power plant controller 103 may be connected to, or may comprise a Supervisory Control And Data Acquisition (SCADA) system. The wind power plant 100 may include one or more wind turbines 101 which collectively act as a one generating power plant ultimately interconnected by transmission lines with the power grid 102, which may be a three-phase power grid. The wind turbines 101 may be gathered together at a common location in order to take advantage of the economies of scale that decrease per unit cost with increasing output. It is understood by a person having ordinary skill in the art that the wind power plant 100 may include any number of wind turbines of the same or different capacity in accordance with a targeted power output.

In one embodiment of the invention, the power plant controller 103 may be configured to generate a power reference signals to the group of wind turbines 101. Based on the power reference signal the wind turbines in the wind power plant may adjust one or more operational parameters, e.g., blade pitch angles, so that the wind power plant produces the power defined by the power reference signal. The power reference signal may also be configured to activate and/or deactivate one or more turbines in the group of wind turbines.

Figure 2:
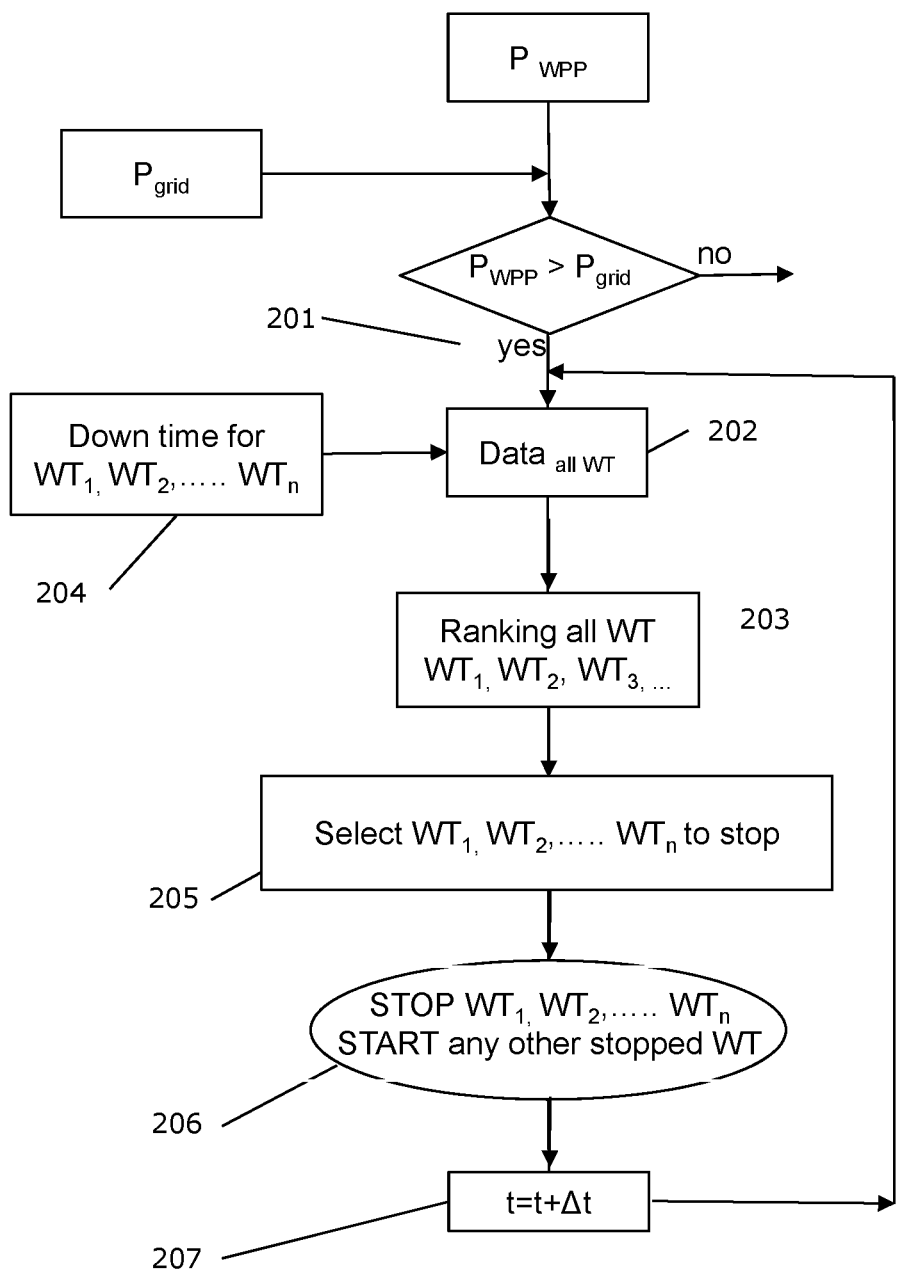
FIG. 2 is a flow diagram of exemplary operations performed by a wind power plant controller, according to an embodiment of the invention.

FIG. 2 is a flow diagram illustrating a mode of operation performed by a wind power plant controller according to an embodiment of the invention. As described above, the available wind resources and the power requirement or power demand of the utility grid 102 may vary over time. Therefore, it is possible that the power capability of the wind turbines in the group of wind turbines, $P_{WPP}$, exceeds the power required by the grid, $P_{grid}$. In such situations, one or more power curtailment commands may be received from the utility grid, requesting that the amount power produced by the wind power plant be curtailed, 201. In such instances, the power plant controller 103 may deactivate one or more turbines 101 in the wind power plant 100 to reduce the amount of power produced.

According to embodiments of the invention the selection of which one or more wind turbine to deactivate to meet the power curtailment requirement from the power utility grid is determined based upon retrieving data from all the wind turbines WT in the group of wind turbines, 202. Then all the wind turbines are ranked, $WT_1$, $WT_2$, $WT_3$, ..., 203 according to a set of ranking criteria and based on the retrieved data. Here and in FIG. 2, $WT_1$ then refers to the wind turbine first in the present ranking, $WT_2$ second in the ranking and so forth. Each time a ranking is performed, some other wind turbine in the group may then potentially be $WT_1$ and so forth.

In one specific embodiment the retrieved data may include data on the down time for any wind turbine in the group which is presently deactivated, 204. By the down time it is understood the time the wind turbine in question has been uninterruptedly deactivated. The down time may then be a parameter (or the only) in one criteria used to rank or prioritize the wind turbines for example so that a first wind turbine is selected to be swapped with another wind turbine in the group if the first wind turbine has been stopped or deactivated for a certain amount of time. Hereby is avoided that any wind turbine in the group can be stopped for too long a time regardless of whether the power curtailment command is still present or perhaps even increased.

Upon ranking all the wind turbines in the group of wind turbines, 203, according to the ranking criteria is selected the n wind turbines in the group to be deactivated, $WT_1$, $WT_2$, ..., $WT_n$, in order to meet the power curtailment requirement, 205, i.e. the first n wind turbines in the latest ranking. The number of turbines to be stopped, n, may be one or more depending on the power curtailment command. These wind turbines are then stopped, 206. This step may further include reactivating the wind turbines which are no longer selected for deactivation in case the ranking has changed compared to earlier.

After a certain time interval, the data are again retrieved not only from the active wind turbines but also from any deactivated wind turbines. Then the ranking criteria are re-evaluated and all the wind turbines are ranked again according to the updated prioritization. This updated ranking is then used to reselect which wind turbines should be deactivated potentially swapping some of the wind turbines in the group. If the ranking is unchanged as well as the power curtailment requirement from the grid, the active and stopped wind turbines remain the same. In other words the method steps of data retrieval, 202, 204, ranking, 203, and selecting of wind turbines to deactivate and reactivate 205, 206, are repeated at time intervals.

As mentioned above, the power plant controller 103 may be configured to periodically or continuously collect data from the wind turbines of the group. Examples of data may include, for example, the down time of each wind turbine as described above, data regarding failures, data from sensors (e.g., blade load sensors, tower load sensors), environmental conditions (e.g., wind speed and direction, turbulence), accumulated power production, relative position of the turbines in relation to one or more other turbines given the wind direction, and the like.

The data considered by the operation method may include fatigue data collected over a lifetime of each wind turbine, such as for example data indicating a total number of failures or faults experienced by each turbine. The total number of failures or stops of each turbine may indicate a long term state of health of the wind turbine. In one embodiment, turbines having a relatively large number of faults and/or failures may be highly prioritized for deactivation.

In one embodiment of the invention, the retrieved data may include data indicating a total number of alarms or faults associated with each wind turbine over a predefined time window (e.g., the last 4 hours, the last week, or the like). The alarms may include any type of alarm, for example, an alarm caused by a blade sensor indicating that there are excessive loads on the blade which may cause the blade damage or a temperature increase. The total number of alarms for a turbine within a predefined time window may indicate a state of health of the turbine in the short term. In one embodiment of the invention, wind turbines having a relatively high number of alarms in the predefined time window may be given a higher priority for deactivation.

In one embodiment of the invention, the retrieved data may include data indicating the total amount of power produced by each wind turbine. The total amount of power produced by each turbine may be strongly correlated to the loads experienced by components of the wind turbine, and therefore, the fatigue experienced by the turbine over its lifetime. Accordingly, in one embodiment, wind turbines with a relatively greater amount of lifetime power production may be prioritized for deactivation.

Other types of retrieved data may include current wind conditions, the relative positions of the wind turbines in the wind power plant, and current wind turbulence data from each of the wind turbines in wind power plant.

If multiple ranking criteria are used to determine which turbines should be activated or deactivated, different relative priorities may be assigned to each criteria to yield the final ranking. For example, suppose a first turbine has experienced 20 lifetime faults and a second turbine has experienced 15 lifetime faults. Accordingly, based on the historical fault data it may seem that the second turbine should be activated and the first turbine deactivated. However, if the second wind turbine is experiencing extreme wind conditions which may damage the turbine, and the first wind turbine is not experiencing extreme wind conditions, then the power plant controller may select the first turbine for activation (even though it has a higher number of lifetime faults), and select the second turbine for deactivation.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention claimed is:

1. A method for operating a group of wind turbines in a wind power plant coupled to a utility grid, the method comprising:

determining, in response to receiving a power curtailment command from the utility grid, that one or more wind turbines in the group of wind turbines should be deactivated;

determining a running time and uninterrupted down time for each wind turbine in the group of wind turbines;

retrieving first data from each wind turbine in the group of wind turbines including the running time and uninterrupted down time for each wind turbine in the group of wind turbines;

ranking, based on the first data, all the wind turbines in the group of wind turbines according to a set of ranking criteria;

selecting a first set of one or more wind turbines in the group of wind turbines to be deactivated at a first time based on the ranking;

controlling the wind turbines of the group such that the first set is deactivated at the first time;

retrieving second data from each wind turbine in the group of wind turbines, including updated running time and uninterrupted down time for each wind turbine in the group of wind turbines;

updating the ranking of all the wind turbines in the group of wind turbines based on the second data; and selecting a second set of one or more wind turbines in the group of wind turbines to be deactivated at a second time based on the updated ranking, wherein at least one wind turbine included in the first set is excluded from the second set based on an associated uninterrupted down time; and controlling the wind turbines of the group such that the second set is deactivated and the at least one wind turbine is reactivated at the second time.

2. The method according to claim 1, wherein the first data comprises downtime data indicating a respective length of time that each presently deactivated wind turbine in the group of wind turbines has been presently deactivated, wherein the set of ranking criteria comprises a pause criterion taking into account the downtime data, and wherein the second data comprises updated downtime data.

3. The method according to claim 1, wherein selecting the second set of one or more wind turbines in the group of wind turbines to be deactivated comprises reactivating one or more other wind turbines in the group of wind turbines.

4. The method according to claim 1, wherein the first data from each wind turbine comprises a length of time of power production for the respective wind turbine during a time period.

5. The method according to claim 1, wherein the first data from each wind turbine comprises an amount of power produced by the respective wind turbine during a time period.

6. The method according to claim 1, wherein the first data comprises ownership information indicating an owner for the respective wind turbine, and wherein the set of ranking criteria comprises a production criterion that takes into account an amount of power produced to the utility grid by the owner over a prescribed period of time.

7. The method according to claim 1, wherein the first set comprises a plurality of wind turbines included in the second set.

8. The method according to claim 1, wherein determining that one or more wind turbines in the group of wind turbines should be deactivated comprises:

comparing a power command from the utility grid to a present power capacity of the group of wind turbines; and determining a number of the one or more wind turbines to be deactivated based on the comparison.

9. The method according to claim 1, wherein selecting the second set of one or more turbines is further based on one or more earlier rankings of the wind turbines in the group of wind turbines.

10. The method according to claim 1, wherein the ranking criteria are pre-determined.

11. The method according to claim 1, wherein the ranking criteria are changed dynamically.

12. The method according to claim 1, wherein selecting the first set and selecting the second set are performed at regular prescribed time intervals.

13. The method according to claim 1, wherein the set of ranking criteria comprises:

at least a first criterion based on one or more of load data, running hours data, alarm data, fatigue data, user priority data, and power production data.

14. The method according to claim 1, wherein retrieving the second data from each wind turbine and updating the ranking of all the wind turbines are performed at predefined time intervals.

15. A wind power plant comprising:

a group of wind turbines coupled to a utility grid; and a power plant controller configured to perform an operation, comprising:

determining, in response to receiving a power curtailment command from the utility grid, that one or more wind turbines in the group of wind turbines should be deactivated, determining a running time and uninterrupted down time for each wind turbine in the group of wind turbines, retrieving first data from each wind turbine in the group of wind turbines including the running time and uninterrupted down time for each wind turbine in the group of wind turbines;

ranking, based on the first data, all the wind turbines in the group of wind turbines according to a set of ranking criteria;

selecting a first set of one or more wind turbines in the group of wind turbines to be deactivated at a first time based on the ranking, controlling the wind turbines of the group such that the first set is deactivated at the first time, retrieving second data from each wind turbine in the group of wind turbines including updated running time and uninterrupted down time for each wind turbine in the group of wind turbines;

updating the ranking of all the wind turbines in the group of wind turbines based on the second data; and selecting a second set of one or more wind turbines in the group of wind turbines to be deactivated at a second time based on the updated ranking, wherein at least one wind turbine included in the first set is excluded from the second set based on an associated uninterrupted down time; and controlling the wind turbines of the group such that the second set is deactivated and the at least one wind turbine is reactivated at the second time.

16. The wind power plant of claim 15, wherein the first data comprises downtime data indicating a respective length of time that each presently deactivated wind turbine in the group of wind turbines has been presently deactivated, wherein the set of ranking criteria comprises a pause criterion taking into account the downtime data, and wherein the second data comprises updated downtime data.

17. The wind power plant according to claim 15, wherein retrieving the second data from each wind turbine and updating the ranking of all the wind turbines are performed at predefined time intervals.

18. A power plant controller comprising:

one or more computer processors configured to perform an operation, comprising:

determining, in response to receiving a power curtailment command from a utility grid, that one or more wind turbines of a group of wind turbines should be deactivated;

determining a running time and uninterrupted down time for each wind turbine in the group of wind turbines;

retrieving first data from each wind turbine of the group of wind turbines including the running time and uninterrupted down time for each wind turbine in the group of wind turbines;

ranking, based on the first data, each wind turbine of the group of wind turbines according to a set of ranking criteria;

selecting a first set of one or more wind turbines of the group of wind turbines to be deactivated at a first time based on the ranking;

controlling the wind turbines of the group such that the first set is deactivated at the first time;

retrieving second data from each wind turbine of the group of wind turbines including updated running time and uninterrupted down time for each wind turbine in the group of wind turbines;

updating the ranking of each wind turbine of the group of wind turbines based on the second data; and selecting a second set of one or more wind turbines of the group of wind turbines to be deactivated at a second time based on the updated ranking, wherein at least one wind turbine included in the first set is excluded from the second set based on an associated uninterrupted down time; and controlling the wind turbines of the group such that the second set is deactivated and the at least one wind turbine is reactivated at the second time.

19. The power plant controller of claim 18, wherein the first data comprises downtime data indicating a respective length of time that each presently deactivated wind turbine in the group of wind turbines has been presently deactivated, wherein the set of ranking criteria comprises a pause criterion taking into account the downtime data, and wherein the second data comprises updated downtime data.

20. The power plant controller according to claim 18, wherein retrieving the second data from each wind turbine and updating the ranking of all the wind turbines are performed at predefined time intervals.

* * * * *